INVENTOR
JAN R. COYLE

BY
Paul A. Weilein
ATTORNEY

May 12, 1970  J. R. COYLE  3,511,289

FASTENER ASSEMBLY

Filed Dec. 28, 1967  2 Sheets-Sheet 2

INVENTOR
JAN R. COYLE

BY
Paul A. Weilein
ATTORNEY

United States Patent Office 3,511,289
Patented May 12, 1970

1

3,511,289
FASTENER ASSEMBLY
Jan R. Coyle, San Dimas, Calif., assignor to Brown International Corporation, Covina, Calif., a corporation of California
Filed Dec. 28, 1967, Ser. No. 694,212
Int. Cl. F16b 19/02
U.S. Cl. 151—19                                                 6 Claims

ABSTRACT OF THE DISCLOSURE

The shank of a fastener extends into a bore of a member to engage the member and is provided with a circumferentially extending groove the bottom of which is circular but eccentric. An eccentric insert is seated in the groove for relative rotation into radial binding engagement with the surrounding bore. The shank may be plain or threaded. The groove may be a continuous circumferential groove or may be helical. The insert may be a solid ring or a split ring or may be helical to cooperate with a helical groove. The eccentric insert may be in screw engagement with the bottom wall of the groove.

BACKGROUND OF THE INVENTION

A fastener is commonly employed to extend into a bore of a member to engage the member for the purpose of attaching an object to the member. The most prevalent type of such a fastener is a screw such as a cap screw to thread into a tapped bore.

There has been a long standing need for some means to lock such a fastener in its installed position. For example, screws have been provided with plastic inserts in various ways to resist loosening rotation of the screws. Conventional static plastic inserts, however, are not always capable of creating high resistance to withdrawal of the screws, and, of course, are not suited for installations in high temperature environments.

A further disadvantage of conventional static plastic inserts is that they may unduly resist entrance of the fastener into the bore. There is a need in many instances for a self-locking action that may be delayed until the fastener is admitted into the bore so that the insert will not interfere with the introduction of the fastener into the bore.

There has been a further need for a self-locking arrangement that tightens the fastener in the sense of tending to draw the fastener axially inwardly of the bore. Too often a fastener extending through an aperture of an object into a bore in a body to hold the object against the body is locked in the bore with appreciable play between the object and the body instead of holding the object snugly against the body There is also need for a fastener with a plain or unthreaded shank in combination with means to lock the shank in a smooth bore.

In some instances, there is also need for a fastener that is not releasable in the manner of conventional fasteners. In other words, there is need for a fastener which will permanently lock itself in a bore. Finally, there is a pressing need in the missile art for a fastener that can be quickly released so that a number of such fasteners can be withdrawn to release a structural member in a minimum time interval.

SUMMARY OF THE INVENTION

Broadly described, in most embodiments of the invention, a shank of a fastener dimensioned to slide axially into a bore of a member has a groove extending generally circumferentially of the shank with the bottom wall of the groove of circular curvature but eccentric relative to the axis of the fastener. An insert is seated in the groove and has a circular inner circumferential wall that is eccentric relative to the peripheral wall of the insert. The eccentricity of the bottom wall of the groove and the eccentricity of the insert itself are complementary in the sense that at starting rotary positions of the shank and insert relative to each other the insert is retracted sufficiently radially of the shank to permit the shank to be inserted into the bore. The insert is dimensioned for frictional engagement with the surrounding wall of the bore to resist rotation of the insert when the fastener is rotated in the bore and for this purpose the peripheral surface of the insert may be serrated, knurled, or otherwise roughened.

With the shank and insert at their relative starting positions, the fastener is inserted into the bore with minimum resistance and then the fastener is rotated out of its relative starting position to cause the insert to shift radially into binding engagement with the wall of the surrounding bore. Such a fastener may have a smooth shank with the insert near the inner end of the shank or the fastener may have a threaded shank to fit into a threaded bore with the insert at the outer end of the shank to become effective only after the major portion of the shank is screwed into the bore.

In one form of the invention wherein the groove is a continuous circumferential groove near the inner end of the shank, the insert may be made of resilient material such as a suitable plastic and may be in the form of a split ring with confronting ends. Such a construction makes possible a method of fabrication in which the confronting ends of the split ring are spread apart to permit the split ring to be assembled to the shank.

If desired, an insert in the form of a solid ring may be seated in a continuous circumferential groove of the shank by a fastener. One method of fabricating such an assembly is to form the shank with a reduced eccentric end of circular cross section, then to slip the insert onto the reduced end and, finally, to upset the reduced end to form a head to captivate the insert, the head forming one side wall of the continuous circumferential groove. An alternate method is to slip the insert onto the reduced eccentric end of the shank, then to slip a collar onto the reduced end to captivate the ring and, finally, to stake the reduced end of the shank to make the collar unitary therewith.

In one form of the invention wherein the fastener has a plain shank, a final tightening action is provided to draw the shank into the bore and for this purpose the shank has a helical slot with an eccentric bottom wall and a helical insert of tapered configuration is free to shift longitudinally of the slot. With the tapered insert retracted helically to a starting position towards one end of the slot, the plain shank is inserted freely into the bore to an initial limit position therein and then the fastener is rotated with the tapered insert substantially stationary for radial extension of the insert by wedging action into binding engagement with the wall of the bore. After the insert is wedged to a highly effective degree, there is still room for continuation of the endwise shift of the tapered insert in the groove with additional wedging action so that forcibly continuing the rotation of the fastener results not only in greater wedge action, but also in a cam action between the helical insert and the helical groove of the shank to pull the shank to a second more advanced limit position in the bore.

In another embodiment of the invention the fastener has a plain shank with an eccentric insert in a circumferentially continuous eccentric groove but the groove is substantially wider than the insert and the inner circumference of the insert is in screw threaded engagement with the bottom wall of the eccentric groove. With the insert at its retracted starting position against the side wall of the groove nearest the inner end of the shank, the fastener is introduced freely into the bore to an initial limit position. The fastener is then rotated with the insert stationary to cause the insert to extend radially into binding engagement with the surrounding wall of the bore. The rotation of the fastener is then forcibly continued beyond this point to cause the fastener to be pulled further into the bore by screw action between the fastener and the insert.

Preferably, a feature of the invention is the concept of providing index means for guidance in initially placing the insert at its rotary starting position relative to the shank of the fastener. For this purpose cooperating index marks may be placed on the insert and on the shank of the fastener adjacent the insert.

Another feature of certain embodiments of the invention is the concept of the insert being automatically permanently locked in its position of binding engagement with the wall of the bore. For this purpose the insert is provided with at least one locking recess and a spring-pressed locking pin is installed in the shank of the fastener to cooperate with the locking recess.

The various objects and advantages of the invention may be understood from the following detailed description and the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
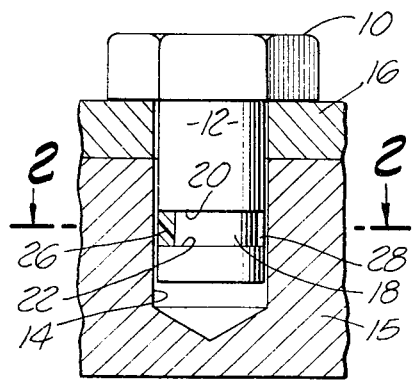
FIG. 1 is a sectional view showing the first embodiment of the fastener at the initial rotary position of the fastener relative to the insert.
Figure 2:
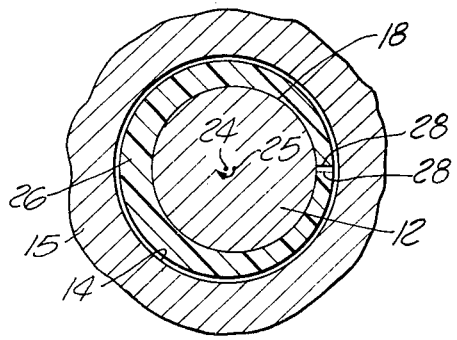
FIG. 2 is a transverse section taken along the line 2—2 of FIG. 1 to show the complementary eccentricities of the bottom of the groove and the insert, respectively.
Figure 3:
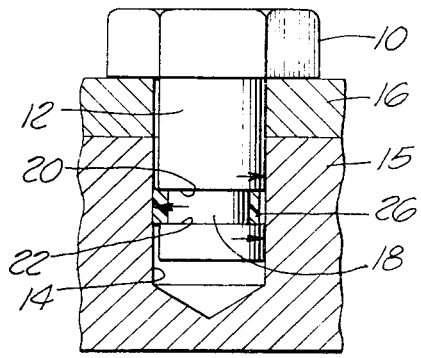
FIG. 3 is a view similar to FIG. 1 showing the fastener rotated to shift the insert radially into binding engagement with the surrounding wall of the bore.

FIGS. 1–3 illustrate an embodiment of the invention in which a fastener having a head 10 and a plain unthreaded shank 12 extends into a bore 14 of a member 15 for the purpose of attaching an object such as an apertured plate 16 to the member. The shank of the fastener is formed with a continuous circumferential groove having a bottom wall 18 and two opposite side walls 20 and 22. As shown in section in FIG. 2, the bottom wall 18 of the groove is cylindrical but is eccentric relative to the axis of the shank 12. Thus, in FIG. 2 the axis of the shank is indicated at 24 and the axis of the inner or bottom wall 18 of the groove is indicated at 25. It is apparent that if the fastener is rotated about the longitudinal axis 24, the axis 25 of the bottom of the groove will move in a circular orbit as indicated by the arcuate arrow.

Seated in the circumferential groove and rotatably embracing the bottom wall 18 of the groove is an insert 26 of the general configuration of a ring. The insert 26 is eccentric in that the inner circumference of the insert conforms to the cylindrical inner wall 18 of the groove, but the outer circumference, while circular, is eccentric relative to the inner circumference. The eccentricity of the insert 26 and the eccentricity of the bottom wall 18 of the groove are complementary in the sense that there are rotary starting positions of the insert and the shank relative to each other at which their combined cross section is circular and of a sufficiently small diameter to permit ready admission of the shank 12 into the bore 14; but when the shank and the insert are rotated relative to each other out of their starting positions, the insert is displaced radially into binding engagement with the surrounding wall of the bore.

FIG. 2 shows the starting positions of the insert and the shank relative to each other and it is apparent that if the fastener is rotated clockwise as indicated by the arcuate arrow, the insert will be shifted radially substantially beyond the outer circumference of the shank and if the shank fits into the bore with reasonable snugness less than 180°, rotation of the fastener will effectively bind the shank in the bore. FIG. 3 shows in cross section the position of the inert 26 when it is in binding engagement with the surrounding wall of the bore and the three arrows indicate how the thrust of the insert against the wall of the bore results in two diametrically opposite reaction forces against the wall of the bore on opposite sides of the circumferential groove. It is apparent that the two reaction forces balance the radial thrust of the insert in that they press the shank against the diametrically opposite side of the bore without any tendency for the forces to cant the fastener.

It is also to be noted in FIG. 3 that with the insert 26 in effective binding engagement with the bore, the side wall 22 of the groove abuts the insert to oppose withdrawal of the fastener from the bore. In other words, the fastener cannot be withdrawn from the bore without withdrawing the tightly bound eccentric insert.

In this embodiment of the invention it is assumed that the insert 26 is of the configuration of a split ring which has two confronting ends 28 as shown in FIG. 2 and it is further contemplated that the insert is sufficiently resilient to permit the two confronting ends to be spread apart sufficiently to clear the diameter of the bottom wall 18 of the groove. Thus, if the insert 26 is made of a suitable plastic material that is relatively hard to resist local deformation but nevertheless is sufficiently resilient for the spreading action, it is a simple matter to expand the insert sufficiently to permit it to be assembled to the shank of the fastener.

Figure 13:
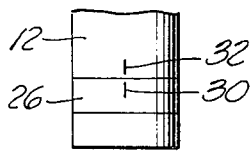
FIG. 13 is a fragmentary sectional view showing how a rotary eccentric insert and an adjacent portion of the shank of the fastener may be provided with index marks for guidance in positioning the insert at its starting position.

One feature of the invention is the concept of providing cooperative index means on the shank 12 and the insert 26, respectively, for guidance in placing the insert and the shank at their relative starting positions. As indicated in FIG. 13, this purpose may be served by providing an index mark 30 on the insert 26 and a cooperative index mark 32 on the shank 12.

It is contemplated that the insert 26 will be adapted for frictional engagement with the wall of the bore 14 to resist rotation relative to the wall when the shank of the fastener is rotated in the bore. For this purpose the insert may have a peripheral surface that is serrated, knurled, or otherwise roughened and it is further contemplated that the insert may be biased to expand in a yielding manner into frictional contact with the wall of the bore. In other words, it is contemplated that the eccentric insert 26 may be slightly oversized for frictional engagement with the wall of the bore but not oversized to such degree as to seriously interfere with admission of the fastener into the bore. It is apparent that employing a resiliently contractable insert in this manner compensates for a liberal range of tolerances in the dimensioning of the bore as well as in the dimensioning of the shank of the fastener.

The manner in which the fastener functions for its purpose may be readily understood. With the insert rotated to its starting position with the guidance of the index marks 30 and 32, the fastener is inserted into the bore 14 and then the wrench is applied to the head 10 of the fastener to rotate the fastener. With the eccentric insert stationary the rotation of the fastener about its axis causes the described orbital movement of the bottom of the groove to thrust the eccentric insert radially outwardly into binding engagement with the bore.

Figure 5:
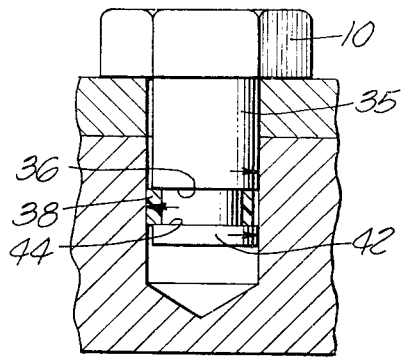

The second embodiment of the fastener shown in FIG. 5 has a head 10 and a shank 35 with a continuous circumferential groove in the shank and with the bottom wall 36 of the groove eccentric in the same manner as in the first embodiment of the invention. The circumferential groove is occupied by an insert 38 of the same character as the first described insert, but in this instance the insert is of the configuration of a solid or continuous ring.

Figure 4:
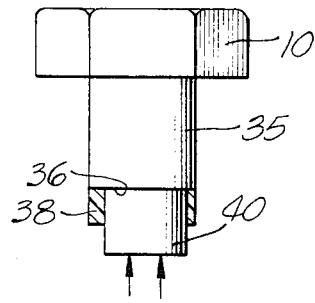
FIGS. 4 and 5 are views partly in side elevation and partly in section showing how the first embodiment of the invention may be fabricated by first forming the shank with a reduced eccentric end and then heading or swaging the reduced end to captivate the insert thereto.

One method of fabricating such a fastener may be understood by reference to FIG. 4 which shows the shank 35 formed with a longitudinal extension 40 of cylindrical configuration that is reduced in diameter and is eccentric relative to the shank. The eccentricity of the extension 40 is the same as the eccentricity of the bottom wall of the groove in the first embodiment of the invention. The insert 38 is of the same eccentricity as the first described insert 26 and is dimensioned to telescope over the shank extension 40.

With the eccentric insert 38 telescoped over the eccentric extension 40 as shown in FIG. 4, the end of the eccentric extension may be suitably upset or swaged to form an inner head 42 to captivate the insert as shown in FIG. 5. Thus, the inner head 42 forms a side wall 44 of the groove that abuts the insert to oppose withdrawal of the fastener when the insert is in binding engagement with the bore. The insert is dimensioned in diameter for relatively snug fit in the bore and preferably the periphery of the insert is roughened to promote frictional engagement with the wall of the bore.

This second form of the invention is employed in the same manner as the first form and here again the radial thrust of the insert against the wall of the bore is balanced by two diametrically opposite reaction forces on opposite sides of the eccentric groove. As shown in FIG. 5, the inner head 42 may be of smaller diameter than the shank but, nevertheless, by virtue of its eccentricity the head makes tangential contact with the surrounding wall of the bore to apply one of the reaction forces to the wall of the bore. Here again, preferably the insert and the shank are provided with index marks such as the index marks 30 and 32 in FIG. 13 for guidance in placing the insert at its starting position.

Figure 6:
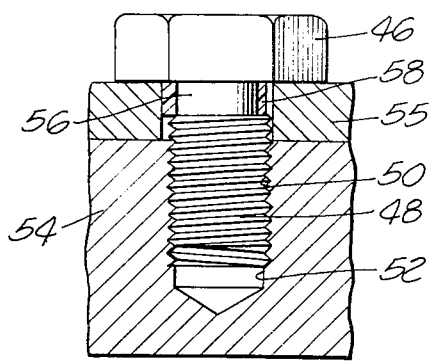
FIG. 6 which is a view partly in section and partly in side elevation illustrates an embodiment of the invention in which the fastener is in the form of a screw having an eccentric insert close to the head of the screw.

In the third embodiment of the invention shown in FIG. 6, the fastener has the usual head 46 and has a shank with an external screw thread 48 for engagement with an internal screw thread 50 of a bore 52 in a member 54, the purpose of the insert being to anchor an apertured plate 55 to the member. The shank of the fastener is provided with a groove close to or adjacent the head 46, the groove having a smooth cylindrical eccentric bottom wall 56. The bottom wall 56 of the groove may be of the same eccentricity as the bottom wall in the first embodiment of the invention and an eccentric insert 58 that is rotatably mounted in the groove may be of the same eccentricity as the insert 26 in the first embodiment of the invention.

Here again, it is contemplated that the insert 58 will be of the configuration of a split ring and will be sufficiently resilient to permit the ring to be expanded for the purpose of assembly to the shank of the fastener. It is further contemplated that the insert may be biased to expand radially and in addition the periphery of the insert may be roughened to promote frictional engagement with the surrounding material. The insert may also be indexed for guidance in placing it at its relative starting position.

An advantage of this embodiment of the invention is that the insert 58 does not encounter any surrounding material until the major portion of the shank of the fastener is threaded into the bore. Thus, it is a simple matter to screw the fastener into the bore until the insert 58 encounters the bore in the plate 55. When the insert makes initial contact with the bore in the member 35, the contact is not sufficient to immobilize the insert, but when a substantial portion of the insert is surrounded by the member 55, the insert resists rotation with the consequence that the fastener will rotate relative to the insert to cause the desired binding action of the insert against the surrounding material of the member 55. Beyond this point the fastener may be forcibly rotated to draw the fastener axially inward until the head 46 of the fastener clamps the plate 55 against the member 54. The insert 58 and the shank of the fastener may be indexed as heretofore explained for guidance in rotating the insert to its initial starting position.

Figure 7:
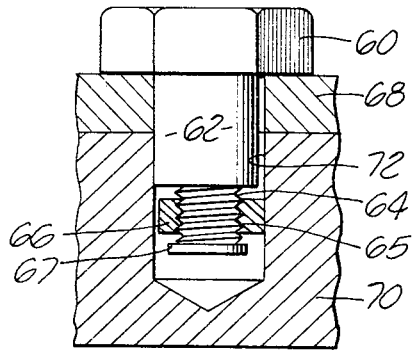
FIG. 7 is a similar view of another embodiment of the invention wherein the eccentric insert has an internal screw thread in engagement with a screw thread on the bottom wall of a groove of the shank of the fastener.

In the fourth embodiment of the invention shown in FIG. 7, the fastener has a head 60 and a smooth shank 62 that is formed with a relatively wide circumferential groove. The bottom wall of the groove is eccentric in the manner heretofore described but in this instance is provided with a screw thread 64 for engagement with the internal screw thread 65 of an insert 66 that is of the general configuration of a solid ring of the usual eccentricity. It is to be noted that the groove is substantially wider than the insert 66 to provide room for the insert to shift by screw action along the bottom of the groove. Here again, the insert and the shank of the fastener may be provided with index marks for guidance in positioning the insert at its starting position. In this instance the insert 66 is made of metal and is a solid or continuous insert without confronting ends. The fastener is fabricated by forming the shank with an eccentric extension of reduced diameter and threading the extension. The eccentric insert is then screwed onto the extension and the end of the extension is then staked or swaged to form the relatively small radial flange 67 that captivates the insert and serves as the second side wall of the groove.

With the insert 66 at its starting position it is sufficiently retracted to permit easy introduction of the fastener into the bore to what may be termed a first limit position with the head of the fastener in snug contact with the apertured plate 68 and with the apertured plate in turn in snug contact against the outer surface of a member 70 in which the bore 72 is formed. The fastener is then rotated by means of a wrench and with the insert 66 adapted for frictional engagement with the bore 72, the shank of the fastener rotates relative to the insert until the insert is displaced radially outward into effective binding engagement with the wall of the bore. When the insert does make effective binding engagement with the wall of the bore, continued forcible rotation of the fastener pulls the fastener inwardly to a second limit position that tightly binds the plate 68 against the member 70, this final tightening action being accomplished by the screw thread 64 of the bottom of the groove cooperating with the internal screw thread 65 of the eccentric insert.

Figure 8:
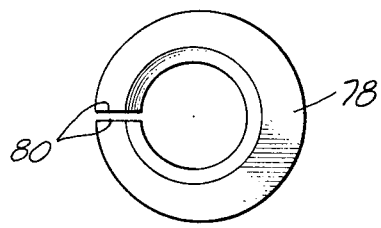
FIG. 8 is a plan view of an insert of the configuration of a split ring that may be substituted for an insert of the configuration of a continuous ring.

If desired, the insert 66 shown in FIG. 7 may be a split resilient ring capable of expansion for the purpose of assembly. Thus, FIG. 8 shows an eccentric insert 78 that may be substituted for the insert 66, the insert 78 being internally screw threaded and being split with two confronting ends 80.

Figure 9:
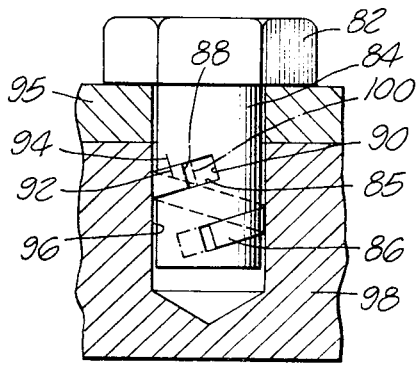
FIG. 9 is a view partly in side elevation and partly in section illustrating an embodiment of the invention wherein a tapered helical insert is seated in a helical groove of tapered depth in the shank of a fastener.

In the embodiment of the invention shown in FIG. 9, the insert has a head 82 and a smooth shank 84 with a helical groove 85 formed in the shank and preferably extending at least 360° around the circumference of the shank. The bottom wall of the helical groove 85 is spiral in that the radius of the groove is progressively reduced, i.e., the depth of the groove is tapered along its length with the depth progressively increasing from one end of the groove to the other as may be understood by reference to FIGS. 10 and 11. The helical groove 85 is occupied by a helical insert 86 of complementary taper in thickness. Thus, the insert 86 tapers in thickness in a manner complementary to the tapering depth of the groove.

Figure 10:
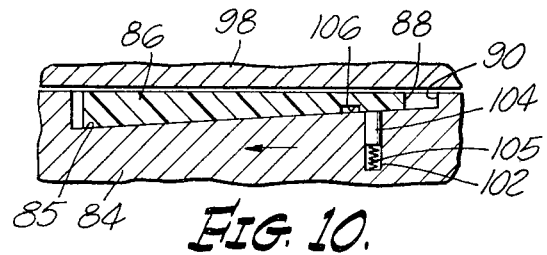
FIGS. 10 and 11 which are diagrammatic sections along the length of the groove, illustrate how a locking pin may be mounted in the shank of the fastener in FIG. 9 to cooperate with locking recesses in the insert for permanently locking the insert in its position of binding engagement with the wall of the bore.

At the starting position of the insert 86 relative to the groove 85 shown in FIG. 9 and indicated diagrammatically in FIG. 10, what may be termed the trailing end 88 of the insert is spaced from what may be termed the trailing end 90 of the helical groove 85. Preferably, the insert 86 is provided with an index mark 92 and the shank is provided with a cooperating index mark 94 for guidance in positioning the insert at its starting position.

FIG. 9 shows the shank 84 of the fastener extending through an apertured plate 95 into a bore 96 of a member 98 for the purpose of anchoring the plate to the member. Since the helical insert 86 is at its normal starting position relative to the helical groove 85, the insert is sufficiently retracted relative to the circumference of the shank 84 to avoid interference with introduction of the shank into the bore 96. It is contemplated that the helical insert will be slightly biased for expansion into frictional engagement with the surrounding wall of the bore without the bias being sufficient to seriously interfere with admission of the fastener into the bore.

FIG. 9 shows the fastener with the insert at its starting position and with the fastener inserted to what may be termed a first limit position in the bore 96 with the head 82 of the fastener in contact with the plate 95 and with the plate 95 in turn in contact with the outer surface of the member 98. Rotation of the fastener by a wrench displaces the helical insert 86 longitudinally of the helical groove 85 to cause the trailing end 90 of the groove 85 to move towards the trailing end 88 of the insert. For example, the trailing end of the insert may creep to a position indicated by a dotted line 100 at which position the insert is wedged into binding engagement with the surrounding wall of the bore.

It is apparent that after the insert makes binding engagement with the bore in this manner, the fastener may be forcibly rotated with consequent cam action against the immobilized insert and consequent axial movement of the fastener inwardly to a second limit position at which the head 82 tightly clamps the plate 95 against the member 98. Thus, if the binding action occurs when the trailing end 90 of the groove shifts to the position indicated by the dotted line 100, the subsequent cam action will move the trailing end of the groove even closer to the trailing end of the helical insert.

An important advantage of this particular embodiment of the invention is that the parts may be so dimensioned relative to each other that the radial outward displacement of the helical insert is substantially uniform around the circumference of the shank with the consequence that the binding engagement of the insert with the wall of the bore is effective around the entire inner circumference of the bore instead of being effective at only one radial region.

Figure 11:
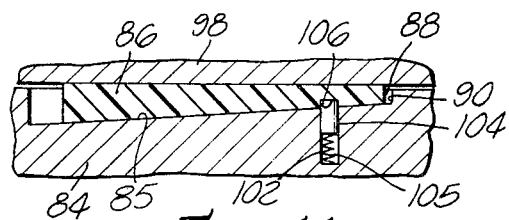

In some practices of the invention it is contemplated that the fastener will make permanent binding engagement with the bore in which it is inserted. In other words, in some installations it may be desirable to provide a fastener that is permanently locked in place with no provision for release and withdrawal of the insert. For this purpose it is contemplated that a locking pin will be mounted in the shank of a fastener to engage a recess in the insert at the binding position of the insert relative to the shank. FIGS. 10 and 11, for example, indicate how the shank 84 of the fastener shown in FIG. 9 may be provided with a radial bore 102 which houses a locking pin 104 under pressure from a coiled spring 105. At the starting position of the helical insert 86 indicated in FIG. 10, the locking pin 104 abuts the smooth inner surface of the insert. When the insert is shifted to a position in binding engagement with the surrounding wall of the bore 96, the locking pin enters a complementary locking recess 106 on the inner or under surface of the insert as indicated in FIG. 11 to lock the insert against retraction.

Figure 12:
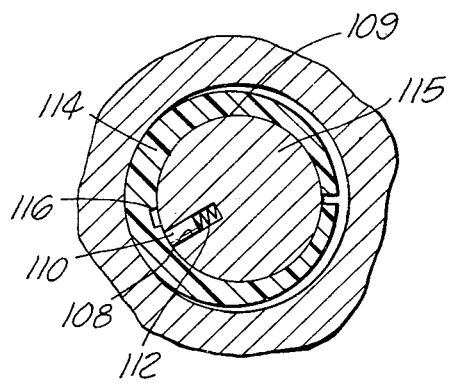
FIG. 12 is an enlarged sectional view showing how a similar locking pin may cooperate with locking recesses of a ring-shaped insert in a continuous circumferential groove of a shank of a fastener.

FIG. 12 indicates how the concept of a permanently locked eccentric insert may be applied to the various embodiments shown in FIGS. 1, 5, 6, and 7. In FIG. 12 the shank of a fastener is provided with a radial bore 108 that communicates with the eccentric bottom wall 109 of a continuous circumferential groove and a locking pin 110 in the radial bore is continuously urged outwardly by a suitable coil spring 112. At the starting position of an eccentric insert 114 relative to the shank 115 of the fastener, an inner locking recess 116 of the insert is out of register with the locking pin 110. When the insert is rotated relative to the shank into effective binding engagement with the surrounding bore, the locking pin 110 seats in the locking recess 116 to prevent retraction of the insert.

My description in specific detail of the selected embodiments of the invention will suggest various changes, substitutions, and other departures from my disclosure.

What is claimed is:

1. In a combination wherein a shank of a fastener telescopes into a bore of a member to anchor an object to the member, the bore having an inner circumferential surface and the fastener having a smooth outer circumferential surface of less diameter than the inner circumferential surface to permit the fastener to slide axially into the bore, the combination of:

a helical groove in one of said surfaces extending generally circumferentially of the one surface, said groove having two uniformly spaced helically extending side walls and a bottom wall, said bottom wall of the groove being eccentric relative to the axis of curvature of the one surface; and an insert in said groove, said insert being slidable along the groove, said insert being of the same width as said groove and of a configuration complementary to the eccentricity of the inner wall of the groove in the sense that at starting rotary positions of the fastener and the insert relative to each other, the insert is retracted sufficiently into the groove to permit unobstructed circumferential passage of the insert and the shank of the fastener when axially inserted into the bore, the insert being dimensioned for frictional engagement with the other of the two circumferential surfaces to resist rotation relative to the other of the two surfaces when relative rotation occurs between the fastener and the member, the insert being dimensioned to extend out of the groove into binding engagement with said other of the two circumferential surfaces in response to relative rotation between the fastener and the member, whereby with the insert at its starting position the shank of the fastener may be inserted into the bore and then relative motion may be created between the fastener and the member to cause the insert to shift radially into binding engagement with said other of the two circumferential surfaces to anchor the shank in the bore and to draw the shank axially of the bore.

2. The combination defined in claim 1 wherein said helical groove is in the said outer surface of said shank.

3. A combination as set forth in claim 2 in which the surface of the insert is provided with a locking recess and in which the shank is provided with a spring-pressed locking pin to engage said recess to prevent rotation of the insert out of its position in binding engagement with the wall of the bore.

4. In a fastener to extend into a bore of a body for engagement with the body, the combination of:
a smooth shank of the fastener being dimensioned to fit into the bore,
said shank having a smooth-bottomed helical groove having uniformly spaced helically extending side walls and being of progressively increasing depth along the length of the groove;
a helical insert of substantially the same width as said groove slidingly mounted in the helical groove and of shorter length than the groove,
said insert being of progressively increasing thickness along its length in the same direction as the increasing depth of the groove,
said insert being dimensioned to assume a starting position with the trailing end of the insert spaced from the trailing end of the groove and with the insert radially retracted sufficiently to permit the shank to be inserted in the groove,
whereby with the insert at its starting position the shank may be inserted into the bore, the shank may be rotated to wedge the insert radially outward into binding engagement with the bore, and then the shank may be forcibly additionally rotated from cam action between the shank and the wedged insert to force the shank further axially into the bore.

5. A combination as set forth in claim 4 in which the helical insert extends substantially completely around the circumference of the shank.

6. A combination as set forth in claim 4 in which the insert is formed with a locking recess and in which the shank is provided with a spring-pressed locking pin to engage said recess to prevent rotation of the insert out of its position in binding engagement with the wall of the bore.

References Cited

UNITED STATES PATENTS

| 1,850,659 | 3/1932 | Condit. | |
| 2,213,919 | 9/1940 | Michon | 287—136 |
| 2,216,208 | 10/1940 | Michon | 287—136 |
| 2,367,213 | 1/1945 | Harding. | |
| 2,367,379 | 1/1945 | Soldan. | |
| 2,412,409 | 12/1946 | Martin. | |
| 2,473,351 | 6/1949 | Thompson et al. | 287—136 |
| 2,526,415 | 10/1950 | Refsdal | 287—136 |
| 2,835,519 | 5/1958 | Spicacci et al. | |
| 2,845,106 | 7/1958 | Baker. | |
| 2,991,096 | 7/1961 | Davidson. | |
| 3,385,613 | 5/1968 | McCall. | |

FOREIGN PATENTS

| 913,838 | 6/1954 | Germany. |
| 101,204 | 10/1925 | Austria. |
| 88,757 | 6/1922 | Austria. |
| 265,608 | 3/1950 | Switzerland. |

MARION PARSONS, Jr., Primary Examiner

U.S. Cl. X.R.

85—5, 64